United States Patent
Håkansson

(10) Patent No.: US 7,150,588 B2
(45) Date of Patent: Dec. 19, 2006

(54) THREAD FORMING TAP WITH A NON-CIRCULAR CROSS-SECTION AND RADIALLY EXTENDING CUTTING EDGES

(75) Inventor: Björn Håkansson, Halmstad (SE)

(73) Assignee: Sandvik Intellectual Property AB, Sandviken (SE)

( * ) Notice: Subject to any disclaimer, the term of this patent is extended or adjusted under 35 U.S.C. 154(b) by 344 days.

(21) Appl. No.: 10/478,445

(22) PCT Filed: May 22, 2002

(86) PCT No.: PCT/SE02/00980

§ 371 (c)(1),
(2), (4) Date: Apr. 22, 2004

(87) PCT Pub. No.: WO02/094490

PCT Pub. Date: Nov. 28, 2002

(65) Prior Publication Data

US 2004/0258492 A1    Dec. 23, 2004

(30) Foreign Application Priority Data

May 22, 2001    (SE) .................................. 0101812

(51) Int. Cl.
*B23G 5/06* (2006.01)
(52) U.S. Cl. ..................... 408/222; 408/215
(58) Field of Classification Search ........ 408/215–222; 470/204, 198; *B23G 5/06*
See application file for complete search history.

(56) References Cited

U.S. PATENT DOCUMENTS

| 150,346 | A | * | 4/1874 | Morgan | 408/222 |
|---|---|---|---|---|---|
| 218,845 | A | * | 8/1879 | Weir | 408/215 |
| 310,462 | A | * | 1/1885 | Patten | 408/218 |
| 662,064 | A | * | 11/1900 | Ehmke | 408/215 |
| 686,278 | A | * | 11/1901 | Fette | 408/222 |
| 3,661,471 | A | * | 5/1972 | Simonffy | 408/220 |
| 5,487,626 | A |  | 1/1996 | Von Holst et al. |  |
| 5,562,371 | A |  | 10/1996 | Reed |  |
| 5,664,915 | A | * | 9/1997 | Hawke | 408/222 |
| 5,725,336 | A |  | 3/1998 | Vilmanyi et al. |  |
| 5,797,710 | A | * | 8/1998 | Sawabe et al. | 408/222 |
| 6,213,693 | B1 | * | 4/2001 | Kato | 408/222 |
| 6,217,267 | B1 | * | 4/2001 | Sugano et al. | 408/222 |
| 6,499,920 | B1 | * | 12/2002 | Sawabe | 408/222 |
| 6,514,148 | B1 | * | 2/2003 | Glimpel et al. | 470/204 |
| 6,685,573 | B1 | * | 2/2004 | Hikosaka et al. | 470/204 |

FOREIGN PATENT DOCUMENTS

DE    33 07 555    9/1984

(Continued)

*Primary Examiner*—Monica Carter
*Assistant Examiner*—J Williams
(74) *Attorney, Agent, or Firm*—Drinker Biddle & Reath LLP

(57) ABSTRACT

A thread-forming tap includes an elongated body having, at first end, a connector portion, and having at a second end, a thread-forming portion. The thread-forming portion includes at least one thread-forming helical thread exhibiting a non-circular cross-section having at least three lobes for plastically deforming an interior wall of a workpiece while forming an internal thread therein. A thread relief portion formed by a helical truncated thread, is disposed between the thread-forming thread and a terminal end of the body. Disposed at the end of the elongated body is at least one radially extending cutting edge for cutting parts of the workpiece interior wall.

10 Claims, 5 Drawing Sheets

FOREIGN PATENT DOCUMENTS

| | | |
|---|---|---|
| DE | 39 34 621 | 4/1991 |
| DE | 40 03 257 | 8/1991 |
| EP | 0 767 024 | 4/1997 |
| EP | 0 953 396 | 11/1999 |
| JP | 61152322 A * | 7/1986 |
| JP | 11019825 A * | 1/1999 |
| JP | 2001138138 A * | 5/2001 |
| RU | 2142867 * | 12/1999 |

* cited by examiner

THREAD FORMING TAP WITH A NON-CIRCULAR CROSS-SECTION AND RADIALLY EXTENDING CUTTING EDGES

TECHNICAL FIELD OF THE INVENTION

Figure 2:
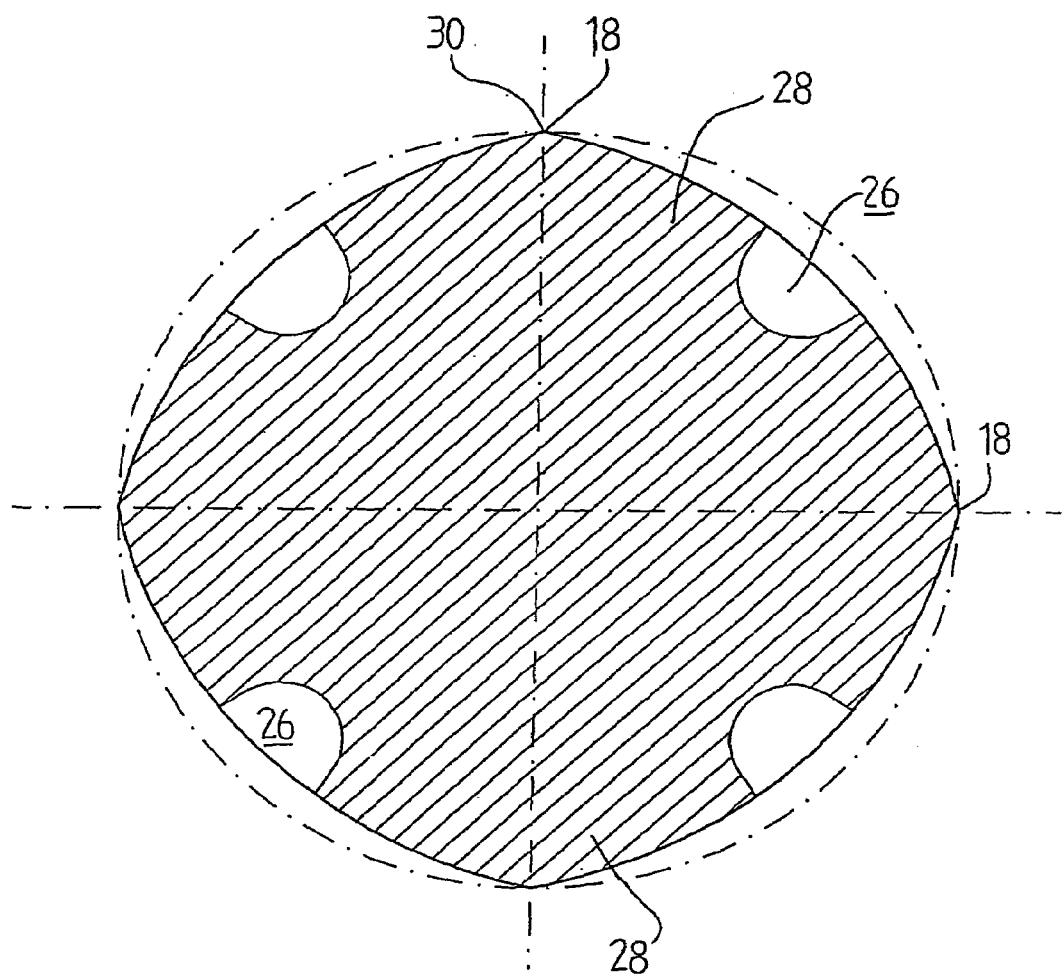

The thread 18 of the thread forming portion is non-circular (see FIG. 2). Instead, each flank is provided with a pointed thread part, each forming a lobe 30 for plastically deforming the interior wall of a hole while forming an internal thread.

TECHNICAL BACKGROUND

Such a thread forming tap is known from EP-A-0 767 024 (corresponding to U.S. Pat. No. 5,797,710). That kind of tap is however disadvantageous, as it can barely be used for other openings than circular cylindrical holes.

SUMMARY OF THE INVENTION

The object of the invention is to achieve an improved thread forming tap.

This has been achieved by the tap of the initially defined kind, wherein at the open end of the elongated body, at least one radially extending edge is provided for cutting parts of the interior wall of said opening.

Hereby is achieved a thread forming tap that pre-forms an opening to a form suitable for thread forming, which in turn extends the working life of the tap, since better thread forming conditions are achieved.

Preferably, said edge extends substantially from the central axis of said elongated 30 body. Hereby, efficient forming of e.g. conical blind holes is achieved.

Suitably, a thread relief portion is provided between said thread forming portion and said open end, said relief portion being provided with a thread having a cut ridge having a substantially circular cylindrical form and being divided by a helical groove for allowing turning the tap away from said opening. Hereby, easy removal of the tap after thread forming is allowed.

Preferably, said cut ridge has a diameter smaller than the largest diameter of the thread forming thread, and wherein said groove has a diameter slightly smaller than the diameter of the cut ridge.

Advantageously, the diameter of the thread of the thread forming portion increases from the level of the cut ridges of the relief portion. Hereby, thread forming is made possible.

Suitably, at least one flank portion extending substantially radially from the axis of the body defines a flute extending substantially in a longitudinal direction of the body and through said thread forming portion, said thread forming thread thereby being cut into a discontinuous thread. Hereby chip removal and supply of cooling fluid supply is allowed.

In particular, said flute is substantially straight. Alternatively said flute is helically shaped about the circumference of said body.

DRAWING SUMMARY

Figure 1:
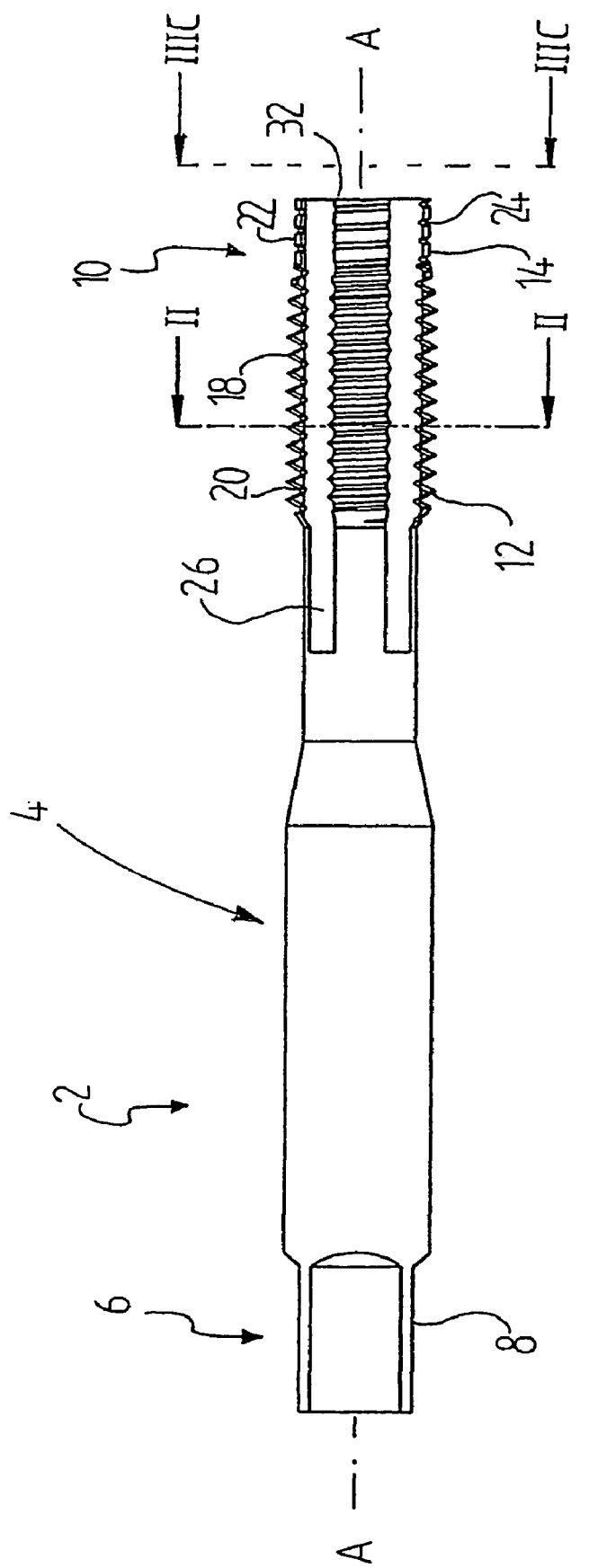
Figure 3A:
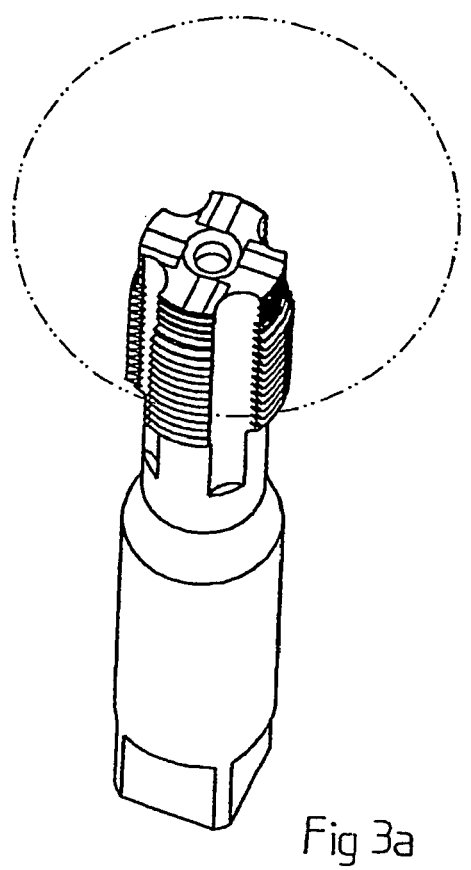
Figure 3B:
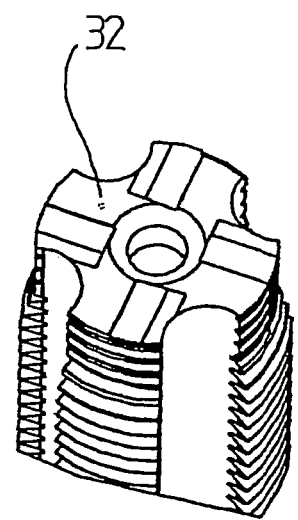
Figure 3C:
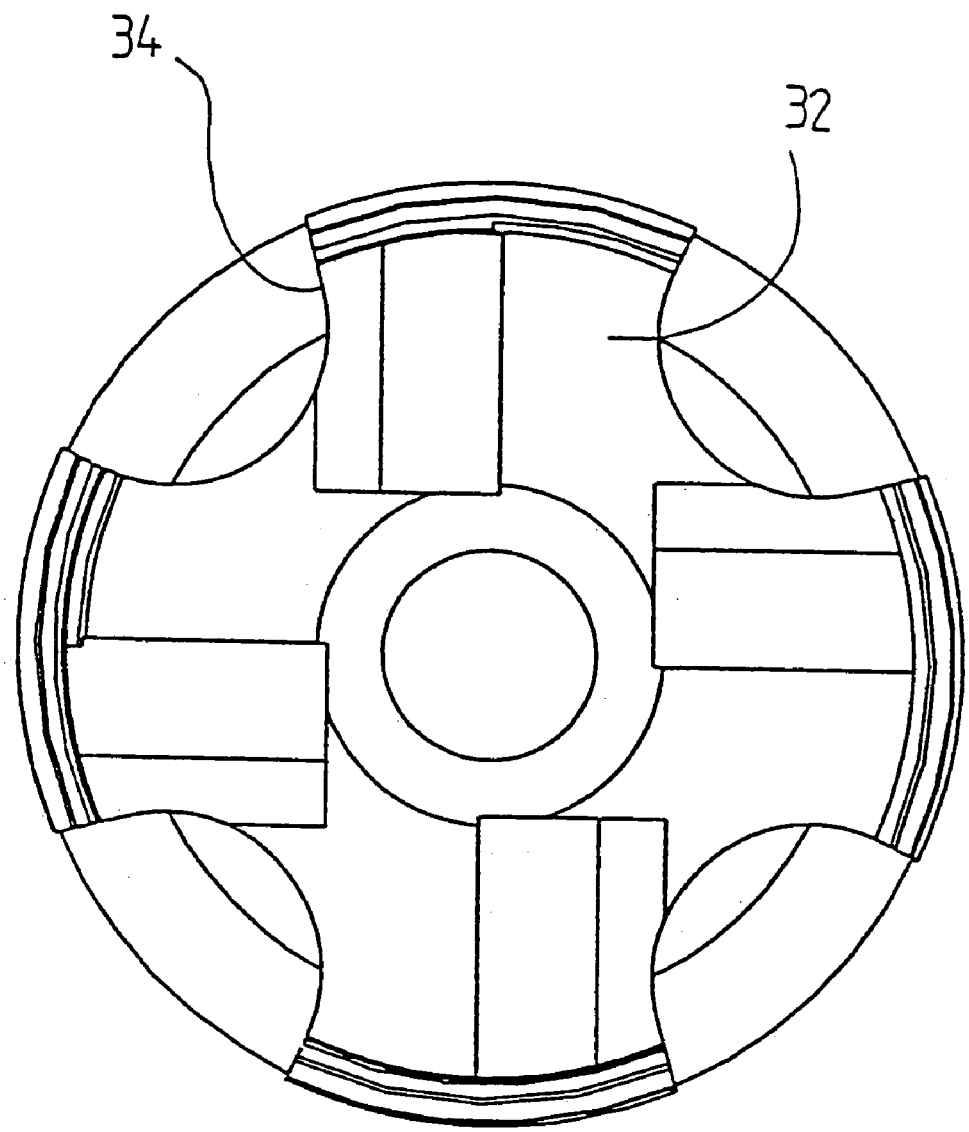
Figure 4:
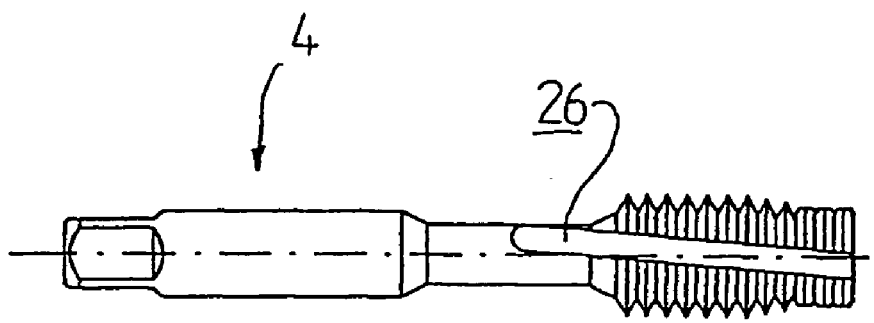

In the following, the invention will be described in more detail by reference to the accompanying drawings, FIG. 1 illustrates a thread forming tap according to the invention, FIG. 2 is a cross-section along the line II—II in FIG. 1, FIG. 3a is a perspective view of the tap shown in FIG. 1, FIG. 3b is an enlargement of the portion within the circle shown in FIG. 3a, FIG. 3c is a front view of the tap shown in FIG. 1, FIG. 4 illustrates an alternative thread forming tap.

DETAILED DESCRIPTION

FIG. 1 shows a thread forming tap 2, comprising an elongated body 4 having an axis A—A. The elongated body 4 has at a first end 6, a connector portion 8 and at a second end 10 a thread forming portion 12, and a thread relief portion 14. The tap 2 is preferably made of a high speed steel or a solid carbide material. The connector portion 8 is adapted to be connected to a tool holder of a drilling or milling machine.

The thread forming portion has a thread forming thread comprising a ridge 18 separated by a helical groove 20. The diameter of the thread 18 increases from the relief portion 14 towards the second end S and after a few pitches, the diameter is constant (however not circular, see below).

The thread relief portion 14 is provided with a helical thread having a cut (truncated) ridge 22 having a substantially circular cylindrical form separated by a helical groove 24. The cut ridge 22 has a smaller diameter than the largest diameter of the thread forming thread 18 and the groove 24 has a diameter slightly smaller than the diameter of the cut ridge 22. The pitch of the thread 22 and the groove 24 of the thread relief portion 14 is the same as in the thread forming portion 12. The thread forming portion allows for turning the tap away from said opening after performed thread forming operation.

The threads 18 and 22 are separated in the longitudinal direction of the body 4 by four flutes 26 (see also FIG. 2). The flutes 26 are thus defined by four flank portions 28. At the periphery of each flank portion 28, the thread 18 and 22 is arranged, respectively (in FIG. 2, only the flank portions of the thread forming portion 12 can be seen). The purpose of the flutes 26 is to allow supply of a cooling fluid and to allow removal of chips.

The four flutes 26 divide the thread 18 into pieces of a thread, the pieces of thread thus forming a discontinuous or virtual thread. The same relates to the thread 22.

The thread 18 of the thread relief portion is non-circular (see FIG. 2). Instead, each flank is provided with a pointed thread part, each forming a lobe 30 for plastically deforming the interior wall of a hole while forming an internal thread.

As can be better seen in FIGS. 3a–3c, the first end 10 defines a terminal open end 32 with four radially extending cutting edges 34 for cutting non-circular cylindrical holes. Cast blind holes are generally not circular cylindrical, but may be slightly conical due to the casting process. The cutting edges 34 are thus utilized for forming the non-circular cylindrical holes to a circular cylindrical shape In FIG. 4, an alternative tap 4 is shown, the difference being that the flute 26 is somewhat helical, rather than straight.

OPERATION

A thread is to be formed in a through-hole or a blind hole of a non-circular cylindrica—in particular irregular—shape, respectively, e.g. in a molded piece of metal.

The tap 2 is moved to the hole defined by a wall (not shown). During its introduction into the hole, the tap is turned and the cutting edges 34 cut the hole and form it to the predetermined circular cylindrical shape. The thread 18 enters the hole and the lobes 30 press the material of the wall at such a high pressure that it is plastically deformed and floates into the groove 20. A cooling fluid is introduced via the flutes. When the thread forming operation is finished, the tap is turned in the opposite direction. The thread relief portion 14 facilitates withdrawal of the tap from the hole.

Of course, the number of flanks 28 and flutes 26 may be less than four, e.g. three, and more than four, e.g. eight.

Furthermore, the flanks 28 and flutes 26 may be helically shaped.

Furthermore, the number of threads may be more than one, i.e. a pair of parallel threads may be provided.

Furthermore, in FIG. 1, the shape of the thread relief portion is illustrated as circular cylindrical. However, it may instead be slightly conical, the largest part of the cone being at the open end 32 of the body 4.

Furthermore, the number of cutting edges may be less than four, e.g. one, or more than four, e.g. ten. However, it is advantageous to arrange the same number of cutting edges as the number of flanks.

The invention claimed is:

1. A thread-forming tap comprising an elongated body having a first axial end section and an opposite second axial end section; the first end section including a connector portion; the second end section having a thread-forming portion for forming a thread in an interior wall of a workpiece; the thread-forming portion comprising at least one thread-forming thread separated by a first helical groove, said thread-forming thread having a non-circular cross section including at least three lobes adapted to physically deform the workpiece interior wall while forming an internal thread therein; wherein the second end section defines a terminal end at which there is disposed at least one generally radially extending cutting edge for cutting parts of the workpiece interior wall; the second end section further including a thread relief portion disposed between the thread-forming portion and the terminal end, the thread relief portion comprising a thread in the form of a truncated ridge separated by a second helical groove; the truncated ridge defining a circular cylinder.

2. The thread-forming tap according to claim 1 wherein the at least one cutting edge comprises at least three cutting edges.

3. The thread-forming tap according to claim 1 wherein the at least one cutting edge extends generally radially inwardly farther than the first helical groove.

4. The thread-forming tap according to claim 1 wherein the at least one cutting edge is formed by a flute formed in an outer periphery of the body and extending generally axially.

5. The thread-forming tap according to claim 1 wherein the truncated ridge has a largest diameter smaller than a largest diameter of the thread-forming thread, the second helical groove having a minimum diameter smaller than the maximum diameter of the truncated ridge.

6. The thread-forming tap according to claim 5 wherein the thread-forming portion extends from an end of the truncated ridge remote from the terminal end, an initial plurality of turns of the thread-forming portion increasing gradually in diameter in a direction away from the truncated ridge.

7. The thread-forming tap according to claim 1 further including at least one flute formed in an outer periphery of the body and extending generally axially through the thread-forming portion to define a discontinuity in the thread-forming portion.

8. The thread-forming tap according to claim 7 wherein the flute is substantially straight.

9. The thread-forming tap according to claim 7 wherein the flute is helically shaped.

10. A thread-forming tap comprising an elongated body having a first axial end section and an opposite second axial end section; the first end section including a connector portion; the second end section having a thread-forming portion for forming a thread in an interior wall of a workpiece; the thread-forming portion comprising at least one thread-forming thread separated by a first helical groove, said thread-forming thread having a non-circular cross section including at least three lobes adapted to physically deform the workpiece interior wall while forming an internal thread therein; the second end section further including a thread relief portion disposed between the thread-forming portion and a terminal end of the second axial end section; the thread relief portion comprising a thread in the form of a truncated ridge separated by a second helical groove, the truncated ridge defining a circular cylinder; wherein the thread-forming portion extends from an end of the truncated ridge remote from the terminal end, an initial plurality of turns of the thread-forming portion increasing gradually in diameter in a direction from the truncated ridge, there being at least one flute formed in an outer periphery of the body and extending generally axially through the thread-forming portion to define a discontinuity in the thread-forming portion, the at least one flute extending to the terminal end of the second end section and defining at such terminal end a cutting edge extending generally radially for cutting parts of the workpiece interior.

* * * * *